N. MINORSKY.
ANGULAR VELOCITY INDICATING APPARATUS.
APPLICATION FILED DEC. 26, 1918.

1,372,184.

Patented Mar. 22, 1921.
5 SHEETS—SHEET 1.

Inventor
Nicolai Minorsky
by his Attorney
H. W. Plucker

N. MINORSKY.
ANGULAR VELOCITY INDICATING APPARATUS.
APPLICATION FILED DEC. 26, 1918.
1,372,184.
Patented Mar. 22, 1921.
5 SHEETS—SHEET 2.
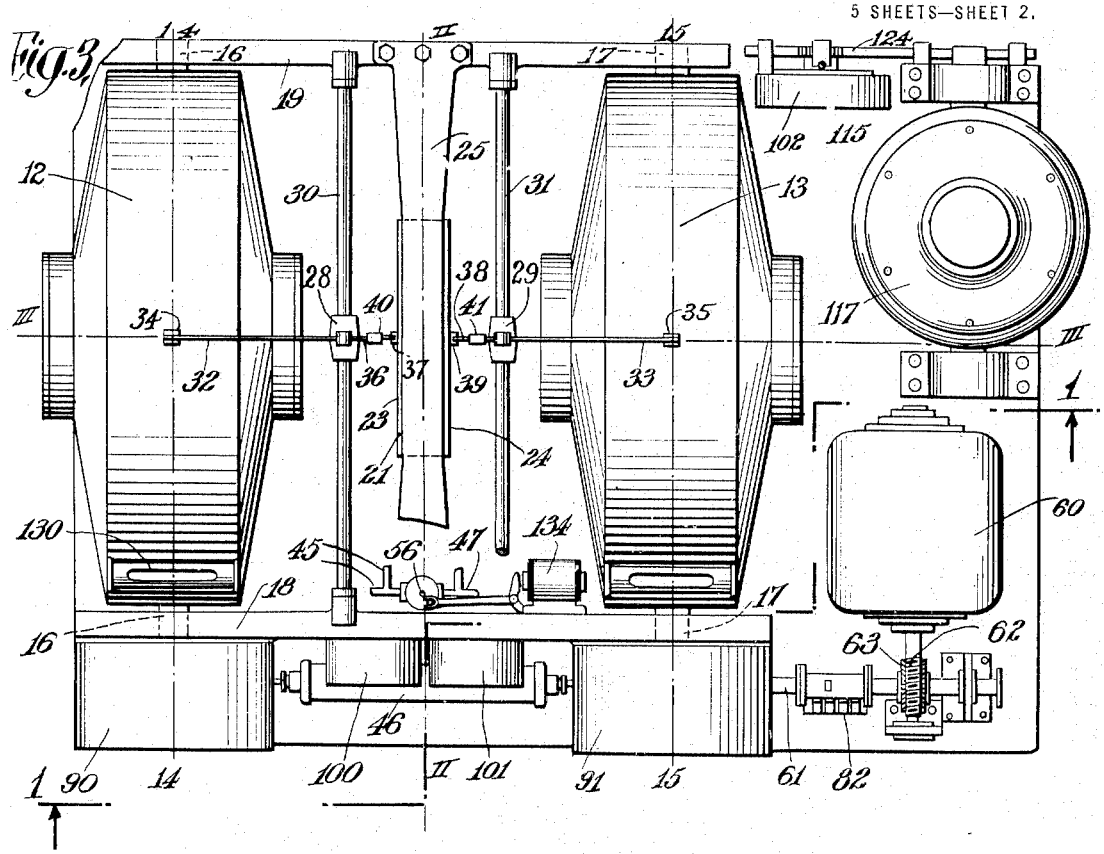
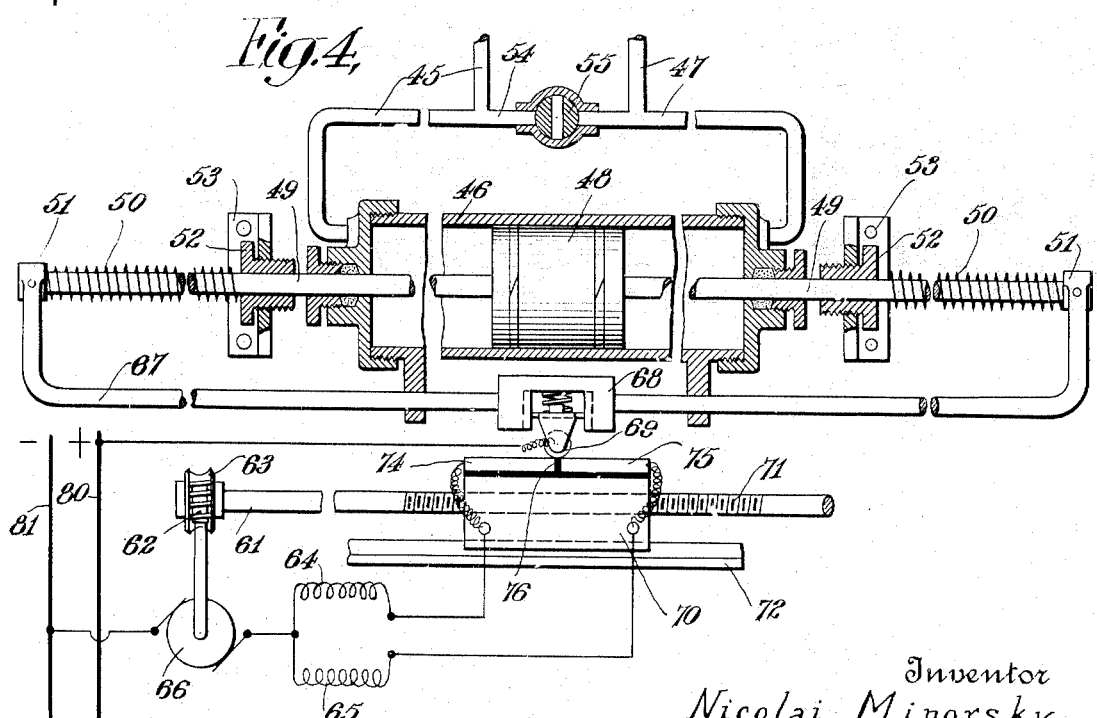
Inventor
Nicolai Minorsky
By his Attorney
H. W. Plucker

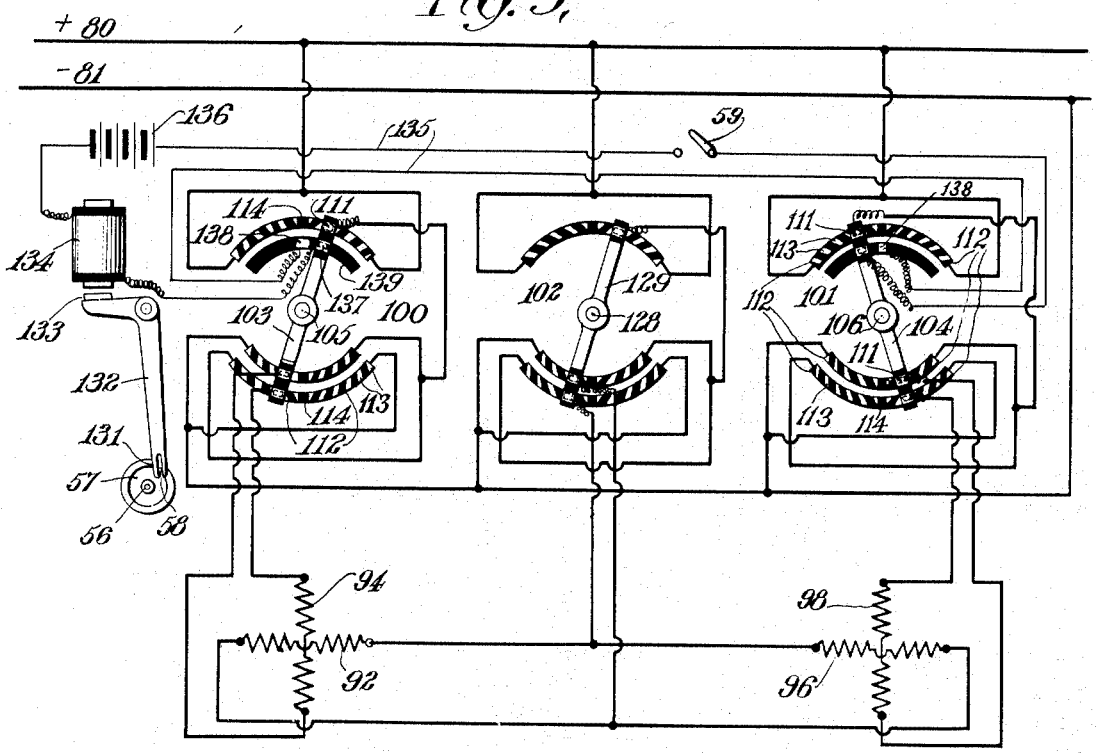
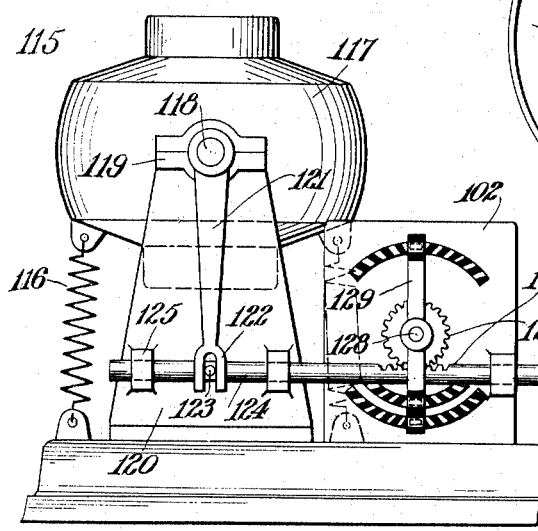
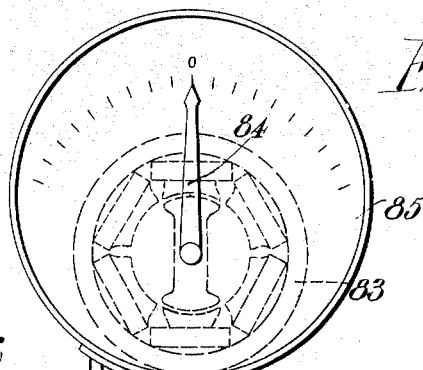
Inventor
Nicolai Minorsky
By his Attorney
H. W. Plucker N. MINORSKY.
ANGULAR VELOCITY INDICATING APPARATUS.
APPLICATION FILED DEC. 26, 1918.

1,372,184.

Patented Mar. 22, 1921.
5 SHEETS—SHEET 4.

Inventor
Nicolai Minorsky
By his Attorney
H. W. Plucker

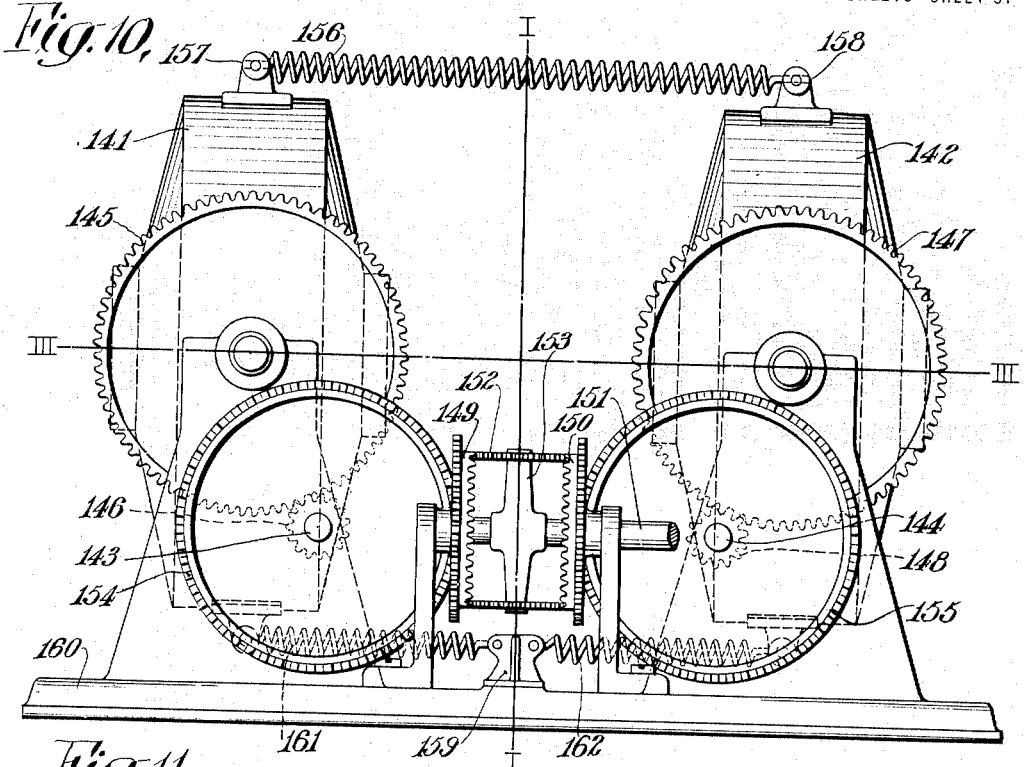
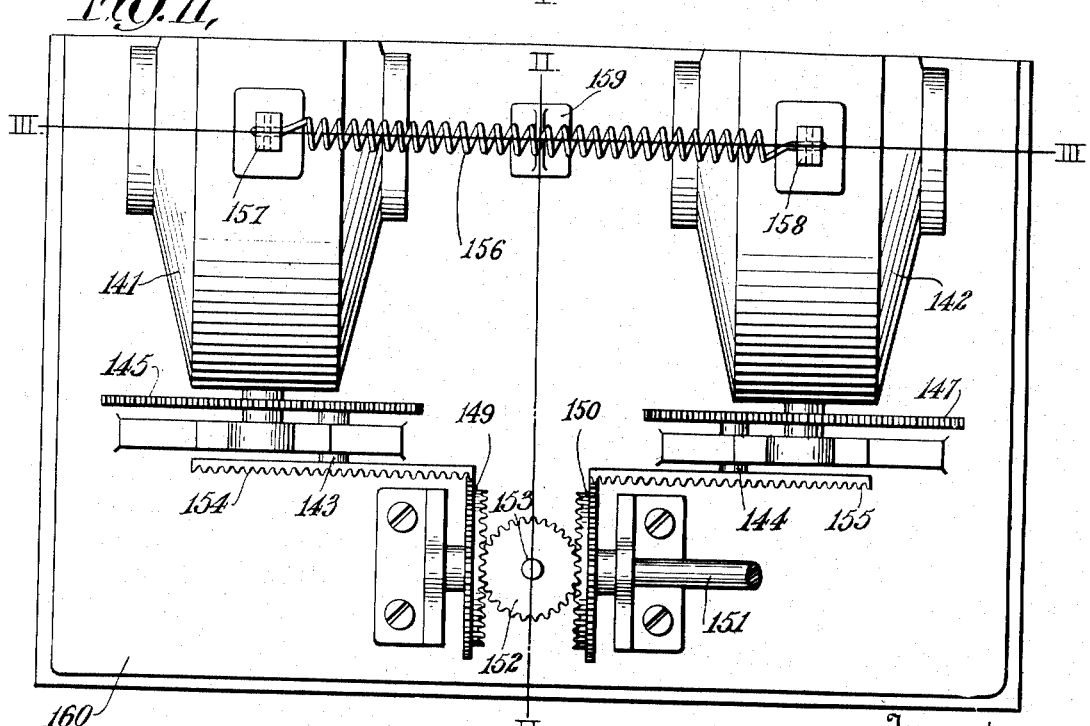

UNITED STATES PATENT OFFICE.

NICOLAI MINORSKY, OF NEW YORK, N. Y.

ANGULAR-VELOCITY-INDICATING APPARATUS.

1,372,184.  Specification of Letters Patent.  Patented Mar. 22, 1921.

Application filed December 26, 1918. Serial No. 268,283.

*To all whom it may concern:*

Be it known that I, NICOLAI MINORSKY, a citizen of Russia, residing at New York, New York, U. S. A., have invented certain new and useful Improvements in Angular-Velocity-Indicating Apparatus, of which the following is a specification.

This invention relates to apparatus for detecting and measuring the angular velocity of vessels, airships and the like. More specifically it relates to an improved type of gyrometer *i. e.* an apparatus for indicating the gyroscopic reaction or force of precession of a gyroscope adapted to rotate in a frame or casing which is free to swing against the resistance of a force opposed thereto. As is well known, the gyroscopic reaction developed under these conditions is proportional to the angular velocity of the body on which the gyrometer is mounted.

The primary object of the invention is to provide a gyrometer which will permit of detecting and measuring an angular motion about an axis without being influenced by any angular motion which may take place about other axes at right angles to said axis. Thus, for example, the perturbing forces normally acting on a ship while navigating, may be decomposed into forces tending to move the ship about three mutually perpendicular axes, *i. e.* an axis perpendicular to the ship's deck, and two axes parallel to the deck, one directed longitudinally and the other transversely of the ship. The angular motions about these three axes are known as yawing, rolling and pitching respectively. In steering a ship it is of great importance carefully to watch the rate of the yawing motion in order to "ease and meet her" at the proper times. Now it often happens that this motion is very small as compared with the rolling and pitching motion taking place simultaneously therewith. With existing gyrometers, in which the gyroscopic reaction is opposed by a torsional wire or by a set of springs, the movements of the means indicative of the angular velocity of yawing will be seriously affected at times by the perturbing influence of pitching and rolling. This influence may be reduced to some extent by suitably positioning the gyrometer, but it has not been possible heretofore to obtain accurate readings under all conditions of operation. This result is attained by my present invention which aims at the complete elimination of the disturbing factors referred to.

It is also an object of my invention to provide a gyrometer which will be steady in operation and, therefore, particularly adapted for use in the steering of vessels by means of automatic devices of the type disclosed in my co-pending application Serial No. 260,866, filed November 2, 1918, in which the helm is subjected to the combined action of apparatus which respond to changes in the direction of motion and in the angular velocity, respectively, of the ship. By eliminating the perturbing factors which, in gyrometers of the current types, cause the means indicative of the angular velocity to oscillate about the position corresponding to the instantaneous value of the angular velocity, I am enabled to control the movements of the steering gear strictly in accordance with the variations in the angular velocity of the ship about any desired axis.

Broadly stated, my invention consists in providing means for neutralizing the action, on an instrument responsive to the angular velocity of a body about a given axis, of any perturbing forces due to movements of such body about an axis or axes at an angle to such axis.

In the preferred embodiment of my invention, I provide two gyroscopes spinning in opposite directions and combine their tilting movements by means of a differential mechanism adapted to oppose a yielding resistance thereto. By this arrangement I may compensate for the action of any perturbing motion occurring alone or in combination with the motion of which the angular velocity is to be determined. To counteract the influence of simultaneous perturbing motions I provide an additional compensating device which, at the proper times, operates automatically to neutralize the forces which can not be eliminated by the differential mechanism.

Other objects and features of my invention will be apparent from the following description of two embodiments thereof, taken in connection with the accompanying drawings in which:

Fig. 3 is a plan view of the gyrometer shown in Fig. 1;

Fig. 4 is an elevation, partly in section, of the mechanism controlling the operation of the indicating device, the electrical connections being indicated diagrammatically;

Fig. 5 is a diagram illustrating the means for automatically controlling the operation of a compensating device forming part of my invention;

Fig. 6 is a partial rear elevation of the apparatus shown in Figs. 1 to 3;

Fig. 7 illustrates by way of example a suitable type of indicating device which may be used in conjunction with the gyrometer;

Fig. 10 is a partial elevation of a modified form of my invention; and

Fig. 11 is a plan view of the mechanism shown in Fig. 10.

Referring more particularly to Figs. 1 to 3, 12 and 13 designate the casings of two identical gyroscopes inclosing gyro-wheels adapted to spin at the same speed in opposite directions. The gyro-casings 12 and 13 may tilt about parallel axes 14—14 and 15—15. As shown, they are provided with trunnions 16, 16 and 17, 17, respectively, which are suitably journaled in parallel standards 18 and 19 supported by a base 20 adapted to be secured to the ship or body of which the angular velocity is to be measured.

I—I, II—II and III—III being three mutually perpendicular axes, if it be desired to record the angular velocity of a motion about axis I—I the apparatus should be so placed that the plane containing the pivotal axes 14—14 and 15—15 will be perpendicular to said axis I—I. This is shown in the position illustrated in Figs. 1 to 3, wherein the axes 14—14 and 15—15 are parallel to axis II—II and the gyro-wheels spin about axis III—III.

Figure 8:
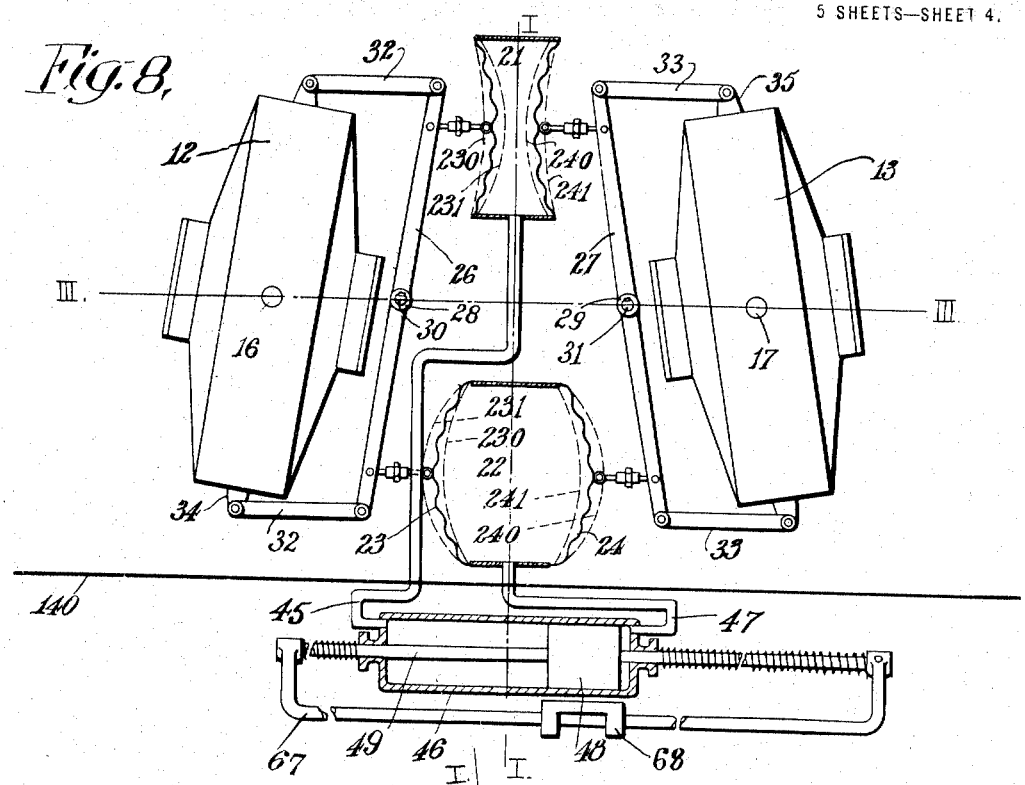
Figs. 8 and 9 illustrate diagrammatically certain parts of the gyrometer under different conditions of operation.
Figure 9:
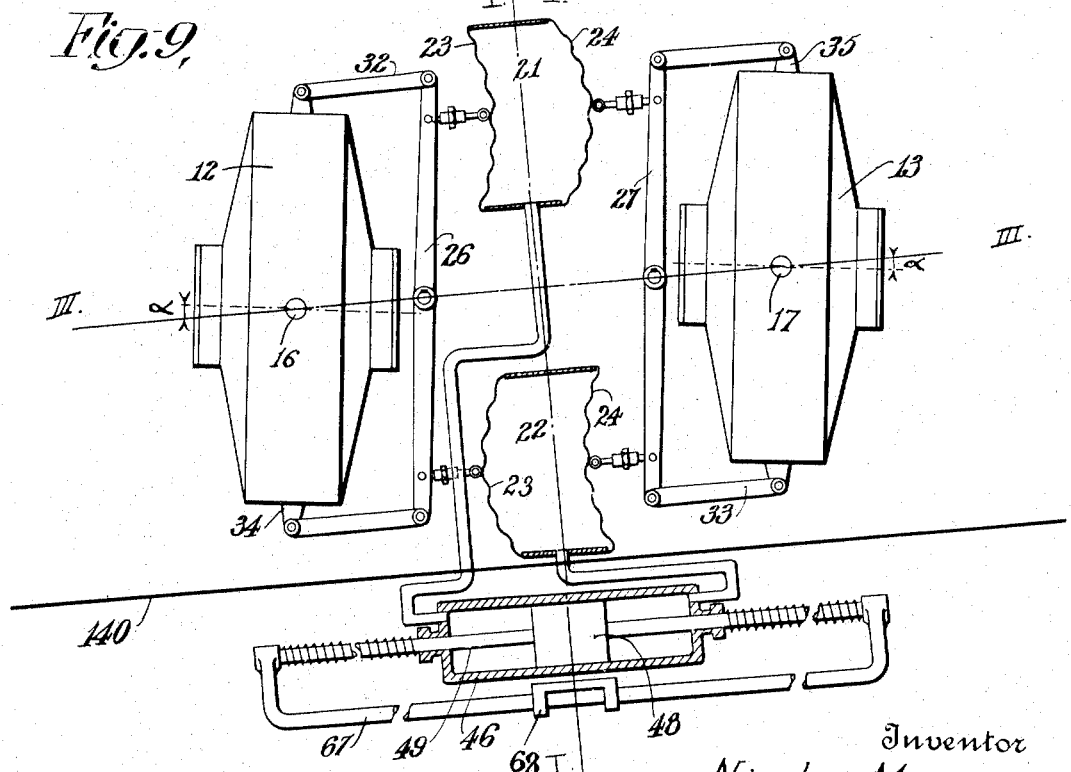

Centrally located between the gyro-casings 12 and 13 are two closed deformable tanks 21 and 22 having walls wholly or partly made of elastic material. The tanks are herein shown to be cylindrical and provided each with elastic end walls 23 and 24 formed of corrugated sheet metal (Figs. 8 and 9). They are preferably arranged one above the other and firmly held at their periphery by a rigid supporting plate or frame 25 secured to the standards 18 and 19 and to the base 20.

The gyro-casings 12 and 13 are operatively connected with the elastic walls adjacent thereto. To this end I provide a pair of rocking levers 26 and 27, each of which is fulcrumed at its center, the said levers being formed with hubs 28 and 29 keyed on parallel shafts 30 and 31, respectively. Shafts 30 and 31 extend horizontally between the standards 18 and 19 in which they are rotatably mounted. The ends of levers 26 and 27 are connected through pivoted links 32, 32 and 33, 33 with brackets 34, 34 and 35, 35 secured to the casings 12 and 13, respectively, at diametrally opposed portions thereof. At points intermediate its ends the lever 26 is pivotally connected with rods 36, 36 pivoted to lugs 37, 37 secured to the walls 23, 23 centrally thereof. Two rods 38 provide a similar connection between the lever 27 and lugs 39 on the walls 24. For purposes of adjustment the rods 36 are shown as made in two parts united by a turnbuckle or sleeve-nut 40. The rods 38, likewise, each comprise two parts united by a sleeve-nut 41.

With this arrangement the gyro-casing 12 and the lever 26 form part of an articulated parallelogram fulcrumed on the parallel axes 14—14 and 30, and adapted to transmit the movements of the casing to the walls 23, so that a tilt of the upper part of the casing 12 to the right, for example, will deflect wall 23 of tank 21 to the right and wall 23 of tank 22 to the left, and vice versa. Gyro-casing 13 forms part of a similar parallelogram whereby it controls the movements of the walls 24.

The walls 23 and 24 of the two tanks oppose a yielding resistance to the movements of the gyro-casings and are adapted to return the same to their normal positions when the force which set them in motion has ceased to act. They also control the operation of the angular velocity indicating mechanism by means of a hydraulic transmission device which will now be described.

A tube 45 connects the tank 21 with one end of a cylinder 46, the other end of which is connected to the tank 22 by a tube 47. A closely fitting piston 48 (Fig. 4) mounted on a rod 49 is arranged to reciprocate in the cylinder 46. The tanks 21 and 22, the tubes 45 and 47 and the cylinder 46 are normally filled with oil or any other suitable liquid. As the two gyroscopes spin in opposite directions with equal speeds, any rotation of the apparatus about axis I—I (or any axis parallel to I—I) will, in accordance with the law governing precessional motion, cause the gyro-casings 12 and 13 to tilt in opposite directions with their associated levers and rods, thereby pushing inwardly the elastic walls of one tank and drawing outwardly the elastic walls of the other, as shown in Fig. 8. The volume of one tank being decreased and that of the other increased by the same amount, the liquid in cylinder 46 will be set in motion and cause the piston 48 to slide in the cylinder. The variation in the volume of each tank is proportional to the tilt of the gyro-casings, which tilt, in turn, is proportional to the angular velocity of the motion of the apparatus about axis I—I, so that the displacement of the piston 48 is indicative of the angular velocity to be measured. In order to increase the sensitiveness of the apparatus the cylinder 46 and piston 48 preferably have a very small cross-sectional area.

It will be observed that the tanks 21 and 22 and their hydraulic connection with piston 48 form a differential system which responds to the movements of the gyro-casings only when the latter tilt in opposite directions. When, under the action of forces which will be analyzed in the description of the operation of the apparatus, the gyros tilt in the same direction and remain parallel, the walls 23 and 24 are deflected in the same direction (Fig. 9) and the deformation of the tanks is not accompanied by a variation in their volume. Piston 48 then remains stationary. As, apart from the fact that they spin in opposite directions, the two gyros are identical in every respect, the possibility of their tilting through different angles under the influence of movements of the apparatus about axes I—I, II—II and III—III is of course excluded.

In order that the piston 48 shall be normally maintained in its central position, which corresponds to strictly horizontal positions of the gyroscopes shown in the drawings (i. e. positions in which the spinning axes of the gyroscopes are strictly horizontal), I provide coil springs 50 surrounding the rod 49 on each side of the cylinder 46 and interposed between collars 51 on rod 49 and adjustable bushings 52 in threaded engagement with guiding brackets 53 projecting from the standard 18.

A direct connection may be provided between the pipes 45 and 47 through a by-pass 54 by operating a normally closed valve 55. This valve may be opened in order to adjust the tension of the springs 50 when the gyroscopes are in their horizontal or neutral positions. The springs 50, therefore, only need to be capable of overcoming the resistance to the flow of the liquid in the by-pass 54 and the portions of pipes 45 and 47 adjacent the cylinder ends, so that comparatively light springs may be employed and the sensitiveness of the apparatus will not be impaired thereby.

The piston 48 may be adapted to operate an index either directly or preferably through a repeating device which may be of any well known or preferred type. For purposes of illustration I have shown an amplifying device comprising a servo-motor 60 adapted to drive a shaft 61 in synchronism with piston 48 by means of worm 62 and worm-wheel 63. Motor 60 has two oppositely wound field coils 64 and 65 (Fig. 4) which may be alternately connected in series with its armature 66, current being directed through one or the other of said coils by a movable contact controlled by piston 48. To this end a rod 67 rigidly connected with rod 49 carries a block 68 in which is mounted a spring-pressed roller 69 of conducting material which bears against an internally threaded block 70 mounted on a screw threaded portion 71 of the shaft 61. Block 70 is prevented from rotating by its engagement with a guide bar 72 extending between the brackets 73 in which the shaft 61 is journaled. On the side of block 70 adjacent roller 69 are two strips of conducting material 74 and 75 separated by a narrow piece of insulating material 76. The strips 74 and 75 are connected with field windings 64 and 65 respectively while the roller 69 and the armature 66 of motor 60 are connected with the line 80, 81, as shown.

When the apparatus is in its inoperative position the piston 48 is halfway between the ends of the cylinder 46 and the roller 69 engages the insulating piece 76, no current being allowed to pass through the motor 60. In operation the piston 48 is moved to either side of its central position and carries block 68 and roller 69 with it, a circuit is made either through strip 74 and coil 64 or through strip 75 and coil 65, and the armature 66 is rotated in the proper direction to move the block 70 until the insulating piece 76 again engages the roller. This operation being practically instantaneous it may be said that the armature of motor 60 and the parts driven thereby move in synchronism with the piston 48. To indicate the instantaneous value of the angular velocity of the body on which the apparatus is supported, there is mounted on the shaft 61 a transmitting switch 82 which controls the operation of a step-by-step motor 83 (Fig. 7) adapted to actuate the pointer 84 of an exhibiting device 85. When the apparatus is used in automatically controlling the steering of a ship or other craft, the switch 82 and device 85 may be omitted, and the shaft 61 affords means for operating a controlling mechanism or device of the type described and illustrated in my co-pending application Serial No. 260,866 above referred to.

The apparatus thus far described will respond to variations in the angular velocity of the apparatus moving bodily about axis I—I. It will not be affected by rotations about axis II—II and axis III—III provided such rotations do not take place simultaneously, as more fully explained hereafter. The combined action of simultaneous movements about axes II—II and III—III, however, would produce on the pivotal axes of the casings 12 and 13 a disturbing torque capable of influencing the position of the piston 48. To counteract this action I have devised an additional compensating device adapted to generate a counter-torque which is always equal and directly opposed to the disturbing torque.

Figure 1:
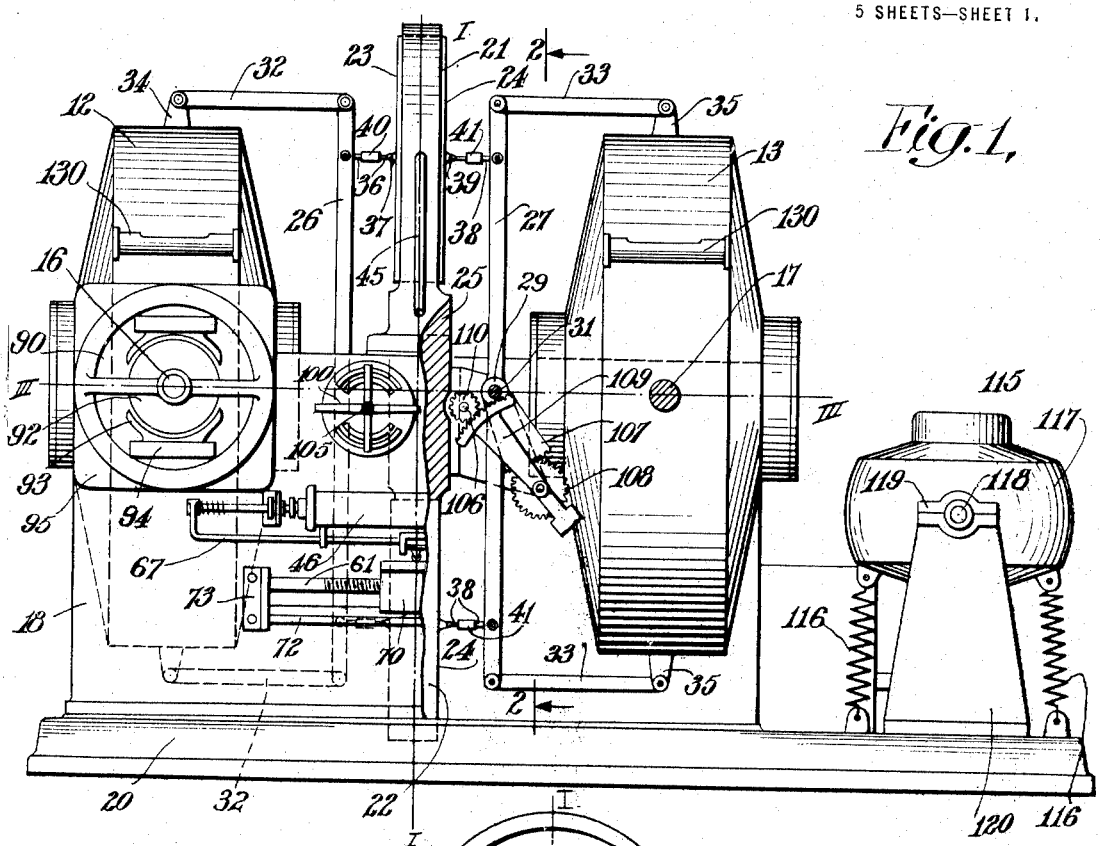
Figure 1 is a front elevation, partly in section on the broken line 1—1 of Fig. 3, of a gyrometer constructed in accordance with my invention.
Figure 2:
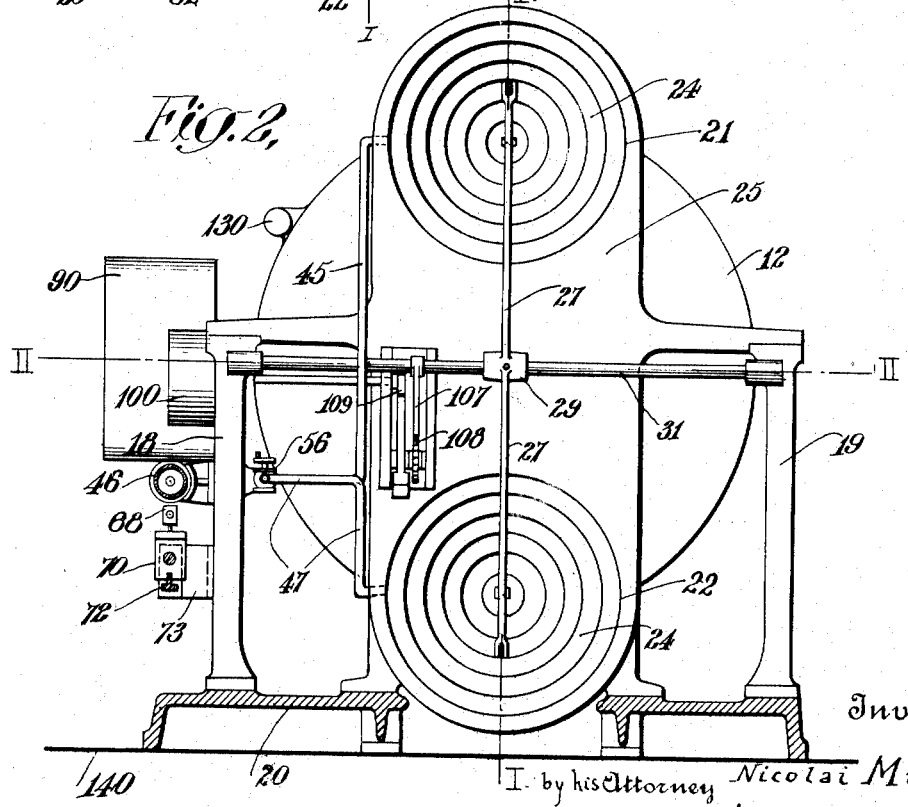
Fig. 2 is a sectional elevation of the same on line 2—2 of Fig. 1.

With this object in view I provide two electric motors 90 and 91, each of which has its armature rigidly mounted on the pivotal axis of one of the gyroscopes. These motors, herein shown to be bipolar D. C. motors, are identical in every respect, so that it will be sufficient to describe one of them. As shown in Fig. 1, 92 is the armature of motor 90, which is secured to one of the trunnions 16 of gyro-casing 12. The stator of this motor comprises the pole pieces 93 carrying the field winding 94, and the casing 95 which is supported by the standard 18. No commutator is required since there is no continuous rotation but merely an oscillation of the rotor through an arc of a few degrees. The current leads are preferably connected to the armature on the neutral line in order that the torque generated shall be maximum for any given value of the field and of the armature current.

The disturbing torque exerted on the pivotal axis of each gyroscope as the result of simultaneous movements of the apparatus about axes II—II and III—III is equal to $K\omega \sin \alpha$, where $K$ is the angular momentum of the gyro-wheel, $\omega$ the angular velocity of the apparatus as a whole about III—III, and $\alpha$ (Fig. 9) the angle between the spinning axis of the gyro-wheel and axis III—III due to the rotation about axis II—II. With uniformly driven gyro-wheels $K$ is a constant factor. The disturbing torque, therefore, is always proportional to $\omega \sin \alpha$ or, for all practical purposes, to $\omega\alpha$, as $\alpha$ seldom exceeds 2 or 3°. As, with slightly saturated magnetic circuits, the torque generated by each of the motors 90 and 91 is proportional to the product of the armature and excitation currents therethrough, compensation may be obtained in a very simple manner by automatically varying one of said currents in proportion to the angle of tilt about axis II—II and the other in proportion to the angular velocity of rotation about axis III—III.

It is of course immaterial whether the armature or the excitation current of the motors is varied in proportion to $\omega$ or $\alpha$, or again whether either of them is proportional to the product $\omega\alpha$ and the other constant. In Fig. 5 I have illustrated diagrammatically a compensating device in which the current in armature 92 of motor 90 and the current in armature 96 of motor 91 are regulated by rheostats 100 and 101, respectively, controlled by the tilt of the gyro-casings 12 and 13 about their pivotal axes, which are parallel to II—II. The currents in field winding 94 of motor 90 and in field winding 98 of motor 91 are regulated by a rheostat 102 common to both excitation circuits and controlled by a device adapted to respond to variations in the angular velocity of the apparatus about axis III—III.

The rheostats 100 and 101 comprise contact arms 103 and 104 respectively mounted on short shafts 105 and 106 journaled in the standard 18. These shafts 105 and 106 are operated by the rock-shafts 30 and 31, respectively, through the intermediary of suitable amplifying gearings. In the right hand side portion of Fig. 1 I have shown the gearing for actuating arm 104, which comprises a toothed sector 107 keyed on shaft 31 and meshing with a gear 108 which drives a toothed sector 109 in mesh with a pinion 110 on the shaft 106. Arm 103 is actuated by rock-shaft 30 in the same manner.

The arms 103 and 104 carry insulated contacts 111 which coöperate with segments 112 arranged in pairs and connected with the line and the armature circuits of motors 90 and 91 as clearly shown in Fig. 5. The segments 112 are provided with contact ribs 113 between which suitable resistances (not shown) are inserted. The ribs 113 are preferably arranged obliquely to the contact arms in order to prevent the current being interrupted as the contacts 111 pass from one rib to the next. Between the segments of each pair is a strip of insulating material 114. The strips 114 are engaged by the contacts 111 when the gyros are in their horizontal positions.

In order to control the operation of the rheostat 102 in accordance with the conditions of angular velocity about axis III—III, I provide means responsive to said velocity, such means, in the apparatus illustrated, consisting of a small auxiliary gyrometer 115 of the known type in which the gyroscopic reaction is counteracted by a pair of springs 116. The casing 117 of the auxiliary gyrometer is adapted to pivot on trunnions 118 journaled in bearings 119 carried by standards 120 secured to the base 20. On one of the trunnions 118 is secured an arm 121 (Fig. 6) having a forked end 122 engaging a projection 123 on a reciprocable rod 124 slidably mounted in stationary brackets 125. The rod 124 has a toothed portion 126 forming a rack, which engages a pinion 127 mounted on the shaft 128 carrying the contact arm 129 of the rheostat 102. As shown in Figs. 1 and 3, the pivotal axis of the gyro-casing 117 is parallel to axis II—II while the spinning axis of its gyro-wheel is parallel to axis I—I so that the gyrometer 115 will respond primarily to the angular velocity of the apparatus about axis III—III. It will be understood that the disturbing effect on gyrometer 115 of any motion of the apparatus about axis I—I or II—II will be negligible, such disturbance being of a secondary character in so far as its action on the counter-torque exerted on pivots 16—16 and 17—17 is concerned.

Any displacement of arm 129 to either side of its central or inoperative position, therefore, will be proportional to the instantaneous value of the angular velocity of the apparatus about axis III—III. The rheostat 102 may be similar in construction to the rheostats 100 and 101, and suitable connections are provided between its contact segments and the field windings 94 and 98 of motors 90 and 91, as shown in Fig. 5.

The adjustment of the apparatus may best be effected when no exterior force tends to rotate the apparatus and the base 20 is perfectly horizontal. The valve 55 being opened, the gyro-casings 12 and 13, which may be provided with spirit levels 130, are adjusted in position by turning the sleeve-nuts 40 and 41. The adjustment should be such that the spinning axes of both gyroscopes will be horizontal and that the elastic walls 23 and 24 will be free from any initial tension. The springs 50 are then adjusted, if necessary, by rotating one or both bushings 52 until the piston 48 is exactly halfway between the ends of cylinder 46.

When the apparatus is used on board ship it may be found sufficient to adjust the position of the piston 48 before each trip. In order, however, to exclude the possibility of errors due to a leakage past the piston I have provided means whereby the valve 55 may be operated automatically when desired. To this end the body of valve 55 is preferably made integral with a short shaft 56 (Figs. 3 and 5) on which is secured a disk 57 carrying a short pin or crank 58 which is engaged by the forked end 131 of a bell-crank lever 132, the other end of which carries the armature 133 of an electro-magnet 134. The winding of this magnet is inserted in a local circuit 135 (Fig. 5) fed by a source of current 136 and controlled by the contact carrying arms 103 and 104 in such a manner that when hand switch 59 is closed the circuit will be made whenever both arms are in their central positions, i. e. whenever the spinning axes of both gyro-casings 12 and 13 are parallel to the ship's deck. As shown, the circuit 135 includes movable contacts 137 on the arms 103 and 104 and narrow stationary contacts 138 arranged between insulating segments 139 and adapted to be engaged by the contacts 137 when the contact carrying arms are in their central positions. With this arrangement the springs 50 are enabled to insure the automatic centering of piston 48 whenever the two gyros have their spinning axes parallel to the ship's deck.

The operation of the gyrometer illustrated in Figs. 1 to 9 now will be described. For purposes of illustration it will be assumed that the apparatus is mounted on the deck 140 of a ship and that the axes I—I, II—II and III—III are in fixed relation to the ship, axis I—I being perpendicular to the deck, II—II extending transversely and III—III longitudinally thereof, the latter two axes being parallel to the deck. I shall successively consider the operation of the apparatus when there is imparted to the ship a motion about I—I (yawing), II—II (pitching), III—III (rolling), and any combination of these motions. It will be obvious that a motion of the ship about any axis parallel to I—I, II—II or III—III would have the same effect as a rotation about I—I, II—II or III—III respectively.

1. *Yawing.*—The two gyroscopes spinning in opposite directions, any movement about axis I—I, as stated above, will cause the casings 12 and 13 to tilt in opposite directions in proportion to the instantaneous value of the angular velocity of yawing. As shown in Fig. 8 wherein the tilt is greatly exaggerated for the sake of clearness, one of the tanks 21, 22 is compressed while the other is expanded. The action of the gyros on the hydraulic transmission device is additive and the piston 48 will be displaced in proportion to the sum of the torques exerted on the trunnions 16 and 17. A comparatively small variation in the volume of the tanks will result in a considerable displacement of the piston 48 which will be transmitted to the index 84 by the electrical repeater device described. The apparatus, therefore, is in the proper position for indicating the angular velocity of yawing.

2. *Pitching.*—As the two gyro-wheels spin in planes which are parallel to axis II—II the gyroscopic phenomena are eliminated with regard to any rotation of the ship about this axis, the gyroscopes being "locked" and losing their gyroscopic resistance about their pivotal axes. However, a torque is exerted on the pivotal axis of each gyroscope by the action of its mechanical inertia, which torque is proportional to the product of the moment of inertia of the gyro and the angular acceleration of pitching. No gyroscopic reaction taking place both gyros are affected in the same manner. They oscillate with respect to the ship, but always remain parallel to each other as shown in Fig. 9, in which the casings 12 and 13 are shown in their true positions, the deck 140 of the ship being inclined. During one half-period of the pitching motion the elastic walls of one tank accordingly will be deflected to the right and those of the other tank to the left, the reverse taking place during the second half-period, but the volume of each tank is unchanged and the piston 48 and index 84 remain in their central positions. The disturbing influence of pitching thus is completely eliminated.

3. *Rolling.*—The two gyros are swung in the planes in which they spin. There is no disturbing torque to be compensated. The movement about axis III—III is the only one whose action can be eliminated in existing gyrometers by suitably positioning the apparatus. All the other disturbances referred to herein will affect the indications given by such gyrometers.

4. *Simultaneous yawing and pitching.*— Under the influence of the yawing motion the gyros tilt in opposite directions as shown in Fig. 8; under the influence of pitching they are oscillated in unison about the position determined by the yawing motion. The walls 23 and 24, therefore, move to and fro between the positions indicated by the dotted lines 230, 240 and 231, 241, respectively. The oscillations due to pitching do not affect the volume of the tanks 21 and 22 so that the piston 48 records only the angular velocity of yawing, the action of pitching being automatically eliminated.

5. *Simultaneous yawing and rolling.*— The yawing motion causes the gyros to tilt in opposite directions. The influence of rolling is felt as soon as such tilting takes place, the gyro-wheels then being at an angle to the plane in which the ship rotates about III—III. A disturbing torque is produced, the direction of which will change after each half-period of the rolling motion. The application of the law of precession to this particular case shows that this torque, at any time, acts in the same direction on the two gyroscopes. The combined effect of simultaneous yawing and rolling, therefore, will be similar to that of combined yawing and pitching, the elastic walls moving to and fro between positions such as indicated by the lines 230, 240 and 231, 241 (Fig. 8), without any variation in the volume of the tanks other than that due to yawing. The perturbing action, consequently, is eliminated.

6. *Simultaneous pitching and rolling.*— The combined action of pitching and rolling gives rise to a disturbance of a very serious character. When these two motions have the same frequency the disturbing torque produced under these conditions always acts in the same direction and gives rise to a steady deviation of the pointer 84, which can not be entirely eliminated by the action of the tanks 21 and 22. In practice the frequence of pitching is about double that of rolling and the value of the torque fluctuates, but it nevertheless may be very troublesome, being subject to beats which are recorded by the indicator. As stated above, this torque which is measured by $K\omega\alpha$, is effectually neutralized in my improved gyrometer by the electro-magnetic devices comprising the motors 90 and 91, which oppose thereto a counter-torque equal to the disturbing torque. The dimensions of the parts of the electro-magnetic devices can easily be determined by calculation; it is clear that if a compensating counter-torque is generated for any two values of the tilt and of the angular velocity of rolling, compensation will take place for every possible value of these factors as long as the saturation of the magnetic circuit does not exceed a predetermined limit. This, however, can easily be avoided in practice, so that a complete elimination of the disturbing torque due to combined pitching and rolling is obtained.

7. *Simultaneous yawing, pitching and rolling.*—The electro-magnetic torque-generating devices are again operative during these combined movements, their action being automatically to subtract from the total torque on the trunnions 16 and 17 a part accounting for the disturbing torque due to the combined pitching and rolling. The differential torque due to yawing alone is transmitted to the elastic walls 23 and 24 and the piston 48 is responsive solely to the variations in the angular velocity of yawing. As in the preceding case the disturbing action due to simultaneous pitching and rolling is entirely eliminated by the electro-magnetic devices.

It follows from the above that whatever be the angular motion of the ship the apparatus will respond only to movements about a given axis I—I and record the angular velocity about such axis without interference from any simultaneous movements about axes II—II or III—III at right angles to I—I. When the ship rotates about an axis oblique to I—I the apparatus responds only to the component of movement adapted to rotate the ship about axis I—I, while the action of the components adapted to rotate the same about axes II—II and III—III is neutralized.

With the apparatus in the position shown in the drawings the differential action of the hydraulic transmission mechanism accounts for the elimination of the disturbing torques due to pitching alone, combined yawing and pitching and combined yawing and rolling. The electro-magnetic devices account for the elimination of the torques due to combined pitching and rolling and to combined yawing, pitching and rolling. It will further be seen that the electro-magnetic devices will also coöperate with the differential mechanism to oppose the disturbing torque due to simultaneous yawing and rolling, as this compound motion will energize both the armature and excitation circuits of motors 90 and 91. The two compensating devices will act independently and in the same direction so that their actions will not interfere and the disturbing torque will be neutralized by the device whose action will first be felt. On yawing, pitching or rolling alone and on simultaneous yawing and pitching the electro-magnetic devices will be inoperative as the two windings of motors 90 and 91 will not be energized at the same time.

It may be stated here that in some cases, more particularly when the frequency of pitching and the frequency of rolling are of different orders, the torque generating devices may be omitted and the differential action of the two gyroscopes relied upon to neutralize the action of perturbing forces with satisfactory results.

The apparatus described will be very sensitive owing to the combined action of the two gyroscopes on the piston 48. Suitable precautions of course will be taken in order to reduce friction in the bearings, and the parts actuated by the gyroscopes will be made as light as consistent with the function they have to perform. It will therefore be understood that the drawings are merely intended to give a diagrammatic illustration of the invention as the size of certain parts such as the motors 90 and 91 and the rheostats 100, 101, 102 has been exaggerated for the sake of clearness.

While I believe that a hydraulic transmission will give the best results, I do not wish to be limited to such arrangement as any differential mechanism would answer the same purpose. Nor is it necessary that the same device shall be utilized for transmitting the movements of the gyroscopes and for opposing their gyroscopic reaction. I have illustrated in Figs. 10 and 11 an arrangement in which a differential gear is employed for controlling the means indicative of the angular velocity about axes I—I.

In this embodiment 141 and 142 are the gyro-casings which inclose gyro-wheels rotating in opposite directions, as in the previous case. The movements of the casings 141 and 142 are transmitted to parallel shafts 143 and 144 by means of suitable amplifying gears 145, 146 and 147, 148. The differential gear comprises the toothed wheels 149 and 150 which are loosely mounted on the differential shaft 151 and engage the planetary wheels 152 whose supporting shaft 153 is secured to shaft 151. The wheels 149 and 150 are driven by crown gears 154 and 155 on the shafts 143 and 144 respectively.

It is evident that the shaft 151 will be responsive to the movements of the gyros when these tilt in opposite directions and that parallel movements of the gyros will merely cause the wheels 152 to rotate on their pivots without turning shaft 151. The action of the differential gear, as regards the transmission of movement, therefore, will be analogous to that of the hydraulic device shown in Figs. 1 to 9. The differential shaft 151, of course, may be used to control the operation of a servo-motor adapted to control a suitable index in a manner similar to that described with reference to Figs. 4 and 7.

To oppose the gyroscopic reaction of the casings 141 and 142 and maintain them normally in their horizontal positions, any suitable yielding device may be employed. In the arrangement shown in Figs. 10 and 11 the two gyros are directly connected at the top by a coil spring 156 fastened at its ends to lugs 157 and 158 on the casings 141 and 142 respectively. At the bottom a fixed anchorage is afforded by the support 159 secured to the base 160 and to which the casings are respectively connected by the springs 161 and 162. I find it advisable to provide a direct yielding connection such as 156 between the two gyros in order to minimize the detrimental effect on the accuracy of the indications given by the apparatus of any slight inequality in the tension or the resiliency of the springs.

In order to eliminate the perturbing influence of simultaneous motions about axes II—II and III—III the apparatus shown in Figs. 10 and 11 should, of course, be supplemented by additional compensating means such as the torque generating devices above referred to.

It will be understood by those skilled in the art that in addition to the modification just described various changes may be made in the construction and the arrangement of the apparatus illustrated in the drawings without departing from the scope of my invention as defined by the claims appended hereto.

I also wish it to be understood that when in the appended claims I refer to a movement of a body about a given axis I intend to cover any movement resulting in a displacement of the body about such axis, including the component about said axis of any movement about an axis oblique or parallel thereto. Furthermore, when I refer to a movement of the gyroscopes, I do not mean an absolute movement of the same but a movement of the gyro-casings relatively to their support, i. e. to the apparatus as a whole and to the body to which it is secured.

I claim:—

1. The combination of gyroscopic constraining means for indicating the instantaneous value of the angular velocity of a body about an axis, with means for eliminating the perturbing action on said means of a movement of said body about an axis at an angle to the first-mentioned axis.

2. The combination of gyroscopic constraining means directly responsive to variations in the angular velocity of a body about an axis, a movable indicating member controlled by said means, and means for preventing said means from acting on said member under the perturbing influence of variations in the angular velocity of the body about an axis at an angle to the first-mentioned axis.

3. The combination of gyroscopic constraining means responsive to variations in the angular velocity of a body about an axis, said means being constrained to move about an axis in fixed relation to said body, an indicating member controlled by said means, and means for eliminating the perturbing action on said member of a movement of said body about an axis at an angle to the first-mentioned axis.

4. The combination of gyroscopic constraining means responsive to variations in the angular velocity of a body, means for yieldingly holding the first-mentioned means in a predetermined position with respect to said body, an indicating member controlled by the movement of the first-mentioned means, and means for preventing said member from responding to movements of said first-mentioned means about an axis at right angles to a predetermined axis.

5. The combination of a movable element, gyroscopic constraining means for moving said element through a distance proportional to the angular velocity of a body about an axis, means for returning said element to its initial position, and means for preventing the first-mentioned means from moving said element under the influence of a movement of said body about an axis at right angles to the first-mentioned axis.

6. The combination of a gyroscope adapted to swing through an angle proportional to the angular velocity of a body about an axis, a movable indicating element, a connection between said gyroscope and element adapted to neutralize the action on said element of precession of said gyroscope due to movements of said body about an axis at right angles to the first-mentioned axis.

7. The combination of a gyroscope adapted to swing through an angle proportional to the angular velocity of a body about an axis, a movable indicating element actuated by said gyroscope, and means operatively connected with said gyroscope and adapted to oppose precession of said gyroscope due to simultaneous movements of said body about axes at right angles to the first-mentioned axis.

8. An angular velocity indicating apparatus comprising means responsive to variations in the angular velocity of the apparatus about an axis, a movable indicating member, means for transmitting energy from said means to said member to control the movements of the latter, said transmitting means being adapted to absorb the movements of the first mentioned means caused by movements of the apparatus about an axis at right angles to said axis.

9. An angular velocity indicating apparatus comprising means responsive to variations in the angular velocity of the apparatus about an axis, a movable indicating member actuated by said means, and means for preventing said means from moving said member under the influence of simultaneous movements of the apparatus about axes at right angles to said axis.

10. The combination of a support, a gyroscope pivotally mounted on an axis in fixed relation to said support, means for yieldingly holding said gyroscope in a predetermined position with respect to said support, a movable member actuated by said gyroscope, and means connected with said gyroscope and adapted to prevent said member from responding to movements of said gyroscope other than those due to a rotation of said support about a given axis.

11. The combination of two gyroscopes adapted to spin in opposite directions, a support for said gyroscopes, indicating means responsive to movements of said gyroscopes caused by movements of said support about an axis, and means for eliminating the action on said means of movements of said gyroscopes caused by movements of said support about an axis at right angles to said axis.

12. The combination of two gyroscopes adapted to spin in opposite directions and having parallel pivotal axes, a support for said gyroscopes, yielding means for opposing their gyroscopic reaction, indicating means responsive to movements of said gyroscopes caused by movements of said support about an axis at right angles to the plane containing said pivotal axes, and means for preventing said means from responding to movements of said gyroscopes caused by movements of said support about an axis parallel to the plane containing said pivotal axes.

13. The combination of two gyroscopes adapted to spin in opposite directions and having parallel pivotal axes, a support for said gyroscopes, and means for combining the movements of said gyroscopes caused by movements of said support about an axis at right angles to the plane containing said pivotal axes, said means being adapted to absorb the movements of said gyroscopes caused by movements of said support about an axis parallel to said pivotal axes.

14. The combination of two gyroscopes adapted to spin in opposite directions and having parallel pivotal axes, and resilient differential means for combining opposite tilting movements of said gyroscopes.

15. The combination of two gyroscopes adapted to spin in opposite directions and having parallel pivotal axes, and hydraulic means for combining opposite tilting movements of said gyroscopes, said means being adapted to absorb parallel tilting movements of the gyroscopes.

16. The combination of two gyroscopes adapted to spin in opposite directions and having parallel pivotal axes, and means for combining opposite tilting movements of said gyroscopes, said means being adapted to oppose the gyroscopic reaction of said gyroscopes and restore the same to their initial positions.

17. The combination of two gyroscopes adapted to spin in opposite directions, two deformable tanks each operatively connected with both gyroscopes, a tubular connection between said tanks, said connection and tanks being filled with liquid, and a member adapted to reciprocate in said connection.

18. The combination of two gyroscopes adapted to spin in opposite directions and having parallel pivotal axes, two deformable tanks arranged centrally between said gyroscopes, each tank having elastic walls facing each one of said gyroscopes, mechanical connections between each gyroscope and the elastic walls adjacent thereto, a cylinder, tubular connections between said tanks and cylinder, said tanks, tubular connections and cylinder being filled with liquid, and a piston slidably mounted in said cylinder.

19. An angular velocity indicating apparatus comprising two identical gyroscopes adapted to spin in opposite directions and having parallel pivotal axes, two tanks arranged one above the other centrally between said gyroscopes, each tank having elastic walls facing each one of said gyroscopes, mechanical connections between each gyroscope and the elastic walls adjacent thereto, a cylinder, tubular connections between said tanks and cylinder, said tanks, tubular connections and cylinder being filled with liquid, a piston slidably mounted in said cylinder, means for adjusting the position of said piston relatively to said cylinder, and indicating means controlled by said piston.

20. An angular velocity indicating apparatus comprising two deformable tanks, means for simultaneously and oppositely varying the volumes of said tanks in proportion to the angular velocity of the apparatus about an axis, means responsive to the variations in the volume of said tanks, and indicating means controlled by the last-mentioned means.

21. The combination of two gyroscopes adapted to spin in opposite directions and having parallel pivotal axes, a hydraulically controlled member responsive to opposite tilting movements of said gyroscopes, and automatic means for restoring said member to a predetermined position whenever the gyroscopes are in their horizontal positions.

22. The combination of two gyroscopes adapted to spin in opposite directions and having parallel pivotal axes, a support for said gyroscopes adapted to be mounted on the deck of a ship or the like, two deformable tanks operatively connected with each of said gyroscopes, a cylinder, tubular connections between said tanks and the ends of said cylinder respectively, said tanks, tubular connections and cylinder being filled with liquid, a piston slidably mounted in said cylinder, a by-pass affording a direct connection between the ends of said cylinders, and a valve in said by-pass.

23. The combination, with the elements recited in claim 22, of springs tending to maintain the piston in a predetermined position, and automatic means for opening said valve whenever the spinning axes of the two gyroscopes are parallel to the ship's deck.

24. The combination, with a support and a gyroscope pivotally mounted in said support, of means for opposing tilting movements of the gyroscope caused by the angular velocity about one axis and the angular tilt of the gyroscope about an axis perpendicular to the first axis, and means for varying the action of the first-mentioned means.

25. The combination, with a support and a gyroscope pivotally mounted in said support, of means for generating a counter-torque equal and opposed to the torque produced on the pivotal axis of said gyroscope by the angular velocity about one axis and the angular tilt of the gyroscope about an axis perpendicular to the first axis, and means for varying said counter-torque in proportion to variations in said torque.

26. The combination, with a support and a gyroscope pivotally mounted in said support, of means responsive to tilting movements of the gyroscope caused by a movement of said support about an axis, and electro-magnetic means adapted to act on the pivotal axis of said gyroscope to oppose a tilting movement thereof caused by the angular velocity about one axis and the angular tilt of the gyroscope about an axis perpendicular to the first axis.

27. The combination, with a support and a gyroscope pivotally mounted in said support, of an electric motor having its armature mounted on the pivotal axis of said gyroscope, and means for varying the torque generated by said motor in proportion to the torque produced by the angular velocity about one axis and the angular tilt of the gyroscope about an axis perpendicular to the first axis.

28. The combination, with a support and a gyroscope pivotally mounted in said support, of indicating means responsive to tilting movements of the gyroscope caused by a movement of said support about an axis, an electric motor having its armature mounted on the pivotal axis of said gyroscope and its stator secured to said support, a rheostat controlling the current in said armature, a rheostat controlling the current in said stator, means responsive to variations in the relative tilt of said gyroscope for controlling the operation of one of said rheostats, and means responsive to variations in the angular velocity of said support about an axis parallel to the spinning axis of said gyroscope for controlling the operation of the other rheostat.

29. The combination of two gyroscopes adapted to spin in opposite directions and having parallel pivotal axes, a support for said gyroscopes, yielding means for opposing their gyroscopic reaction, indicating means responsive to movements of said gyroscopes caused by movements of said support about an axis at right angles to said pivotal axes, and means for preventing said means from responding to movements of said gyroscopes caused by the angular velocity about one axis and the angular tilt of the gyroscope about an axis perpendicular to the first axis.

30. The combination of a plurality of gyroscopes, a movable indicating element, and a resilient differential connection between said gyroscopes and element adapted to transmit differential tilting movements of said gyroscopes to said element.

31. An angular velocity indicating apparatus comprising two gyroscopes adapted to spin in opposite directions and having parallel pivotal axes, differential means for combining opposite tilting movements of said gyroscopes, and means for automatically subtracting, from the total torque produced on the pivotal axis of each gyroscope as a result of angular movements of the apparatus, a partial torque due to the movements of the apparatus about axes parallel to the plane containing said pivotal axes.

32. An angular velocity indicating apparatus comprising two gyroscopes adapted to spin in opposite directions and having parallel pivotal axes, differential means for combining opposite tilting movements of said gyroscopes, indicating means controlled by said differential means, and electro-magnetic means for generating a torque on each of said pivotal axes, said means including a field winding and an armature winding, means responsive to the relative tilting movements of said gyroscopes to control the current in one of said windings, an auxiliary gyroscope having its spinning axis at right angles to the plane containing the pivotal axes of the main gyroscopes, and means responsive to tilting movements of the auxiliary gyroscope to control the current in the other of said windings.

33. An angular velocity indicating apparatus comprising two gyroscopes adapted to spin in opposite directions and having parallel pivotal axes, yielding means for opposing the gyroscopic reaction of each gyroscope, and a movable indicating member controlled by the combined action of said yielding means.

34. An angular velocity indicating apparatus comprising two gyroscopes adapted to spin in opposite directions and having parallel pivotal axes, yielding means for opposing the gyroscopic reaction of each gyroscope, a movable member controlled by the combined action of said yielding means, means for generating a counter-torque equal and opposed to the torque produced on the pivotal axis of each gyroscope by simultaneous movements of the apparatus about axes parallel to the plane containing said pivotal axes, and means for automatically varying said counter-torque in proportion to variations in said torque.

35. The combination of two gyroscopes, means for adjusting their initial positions, means for yieldingly holding said gyroscopes in their initial positions, differential means actuated from the gyroscopes, and a movable indicating element controlled by the differential means for said gyroscopes.

36. The combination of a gyroscope, selective means whereby a component of precessional motion due to a movement about a given axis is isolated from the total angular movement of said gyroscope, and a movable indicating element operatively connected therewith and influenced by said selective means.

In testimony whereof I affix my signature.

NICOLAI MINORSKY